United States Patent [19]

Stokes

[11] Patent Number: 4,959,568

[45] Date of Patent: Sep. 25, 1990

[54] DYNAMICALLY TUNABLE RESONANT DEVICE WITH ELECTRIC CONTROL

[75] Inventor: Brian P. Stokes, Arlington, Mass.

[73] Assignee: General Scanning, Inc., Watertown, Mass.

[21] Appl. No.: 893,481

[22] Filed: Aug. 5, 1986

[51] Int. Cl.[5] ....................... G02B 26/10; H02K 33/00

[52] U.S. Cl. ....................................... 310/51; 310/36; 310/90.5; 350/6.6; 350/486

[58] Field of Search .......................... 310/36, 51, 90.5; 350/6.6, 486, 487, 637; 177/210 FP; 368/155, 156, 157, 159, 160; 331/65, 154, 156; 318/138

[56] References Cited

U.S. PATENT DOCUMENTS

| | | | |
|---|---|---|---|
| 2,488,734 | 11/1949 | Mueller . | |
| 2,570,125 | 10/1951 | Hoare et al. . | |
| 2,640,866 | 3/1949 | Powell . | |
| 2,928,057 | 3/1960 | Jarger . | |
| 3,102,233 | 8/1963 | Charbonneaux . | |
| 3,256,769 | 6/1966 | Matthews et al. . | |
| 3,532,408 | 10/1970 | Dostal | 310/36 |
| 3,678,308 | 7/1972 | Howe . | |
| 3,742,234 | 6/1973 | Laakmann . | |
| 3,811,748 | 5/1974 | Treuthart . | |
| 3,820,040 | 6/1974 | Berry et al. | 331/156 |
| 3,921,045 | 11/1975 | Reich et al. . | |
| 4,021,096 | 5/1977 | Dragt | 350/486 |
| 4,032,888 | 6/1977 | Broyles et al. . | |
| 4,037,231 | 7/1977 | Broyles et al. . | |
| 4,063,287 | 12/1977 | van Rosmalen . | |
| 4,073,567 | 2/1978 | Lakerveld et al. . | |
| 4,076,998 | 2/1978 | Montagu | 310/36 |
| 4,090,112 | 5/1978 | Selverstone | 310/36 |
| 4,302,720 | 11/1981 | Brill . | |
| 4,364,000 | 12/1982 | Burke, Jr. | 310/36 |
| 4,370,019 | 1/1983 | Shirasaki | 318/127 |
| 4,502,752 | 3/1985 | Montagu | 310/27 |
| 4,524,295 | 6/1985 | Allensworth et al. | 310/328 |
| 4,583,752 | 4/1986 | Breitbach | 310/90.5 |

FOREIGN PATENT DOCUMENTS

| | | | |
|---|---|---|---|
| 0157331 | 3/1985 | European Pat. Off. . | |
| 804694 | 11/1958 | United Kingdom . | |
| 931714 | 11/1959 | United Kingdom . | |
| 1465327 | 5/1974 | United Kingdom . | |
| 2168481 | 6/1986 | United Kingdom | 310/330 |

OTHER PUBLICATIONS

Pelsue, K., "Precision, Post-Objective, Two-Axis Galvanometer Scanning", SPIE vol. 390-High Speed Read/Write Techniques for Advanced Printing and Data Handling.

Tweed, D. G., "Resonant Scanner Linearization Techniques", *Laser Scanning and Recording,* 1984, p. 161.

*Primary Examiner*—Patrick R. Salce
*Assistant Examiner*—D. L. Rebsch
*Attorney, Agent, or Firm*—Fish & Richardson

[57] ABSTRACT

An element that moves resonantly has its resonant frequency dynamically tuned to a desired frequency by two components that cooperate via magnetic fields, one component being mounted for motion with the moving element.

19 Claims, 4 Drawing Sheets

FIG 1
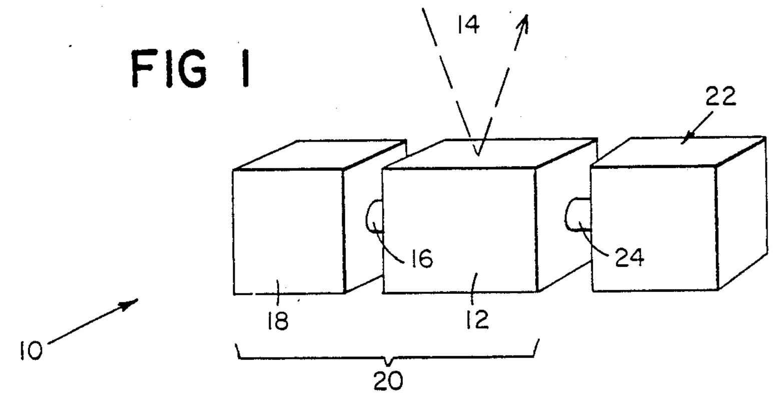
FIG 2
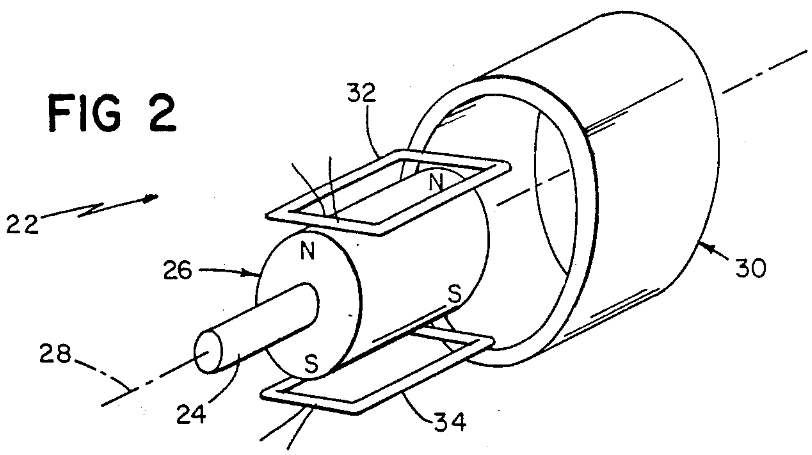
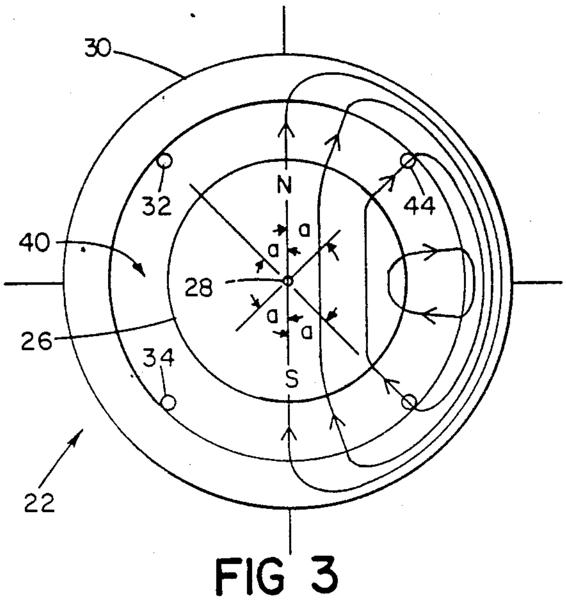
FIG 3
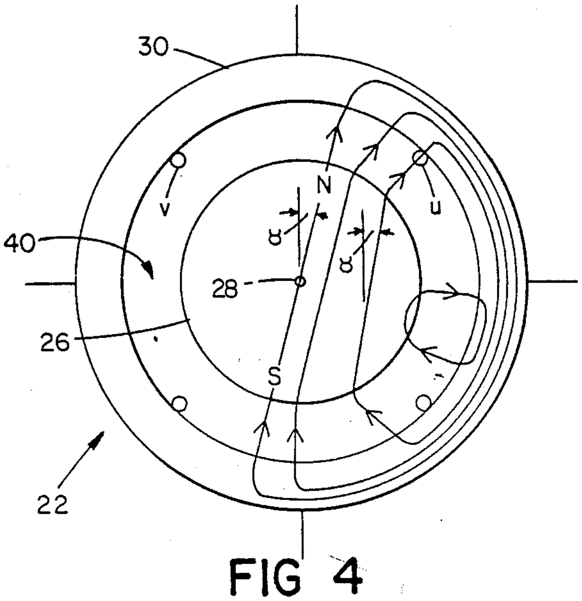
FIG 4

DYNAMICALLY TUNABLE RESONANT DEVICE WITH ELECTRIC CONTROL

BACKGROUND OF THE INVENTION

This invention relates to devices having a moving element characterized by resonant motion. Typically, such a device has a characteristic resonant frequency based on a spring constant and on the inertia of the moving element.

It is known to tune the resonant frequency of such a device by, e.g., adding mass or adjusting the spring constant of the spring element.

SUMMARY OF THE INVENTION

The invention is a device having an element characterized by resonant motion wherein the frequency of the resonant motion is tunable dynamically while the device is in motion.

As a result, the frequency of motion can be tuned to correspond to the frequency of motion of another resonant device, thereby keeping them synchronized.

Other features and advantages will become apparent from the following description of the preferred embodiment, and from the claims.

DESCRIPTION OF THE PREFERRED EMBODIMENT

We first briefly describe the drawings.

DRAWINGS

FIG. 1 is an isometric schematic view of a tunable resonant device.

FIG. 2 is an isometric view, exploded, of the tunable element of the device of FIG. 1.

FIGS. 3, 4 are diagrammatic end views of the tunable element of the device of FIG. 1, in two different angular positions, respectively.

STRUCTURE AND OPERATION

Figure 5:
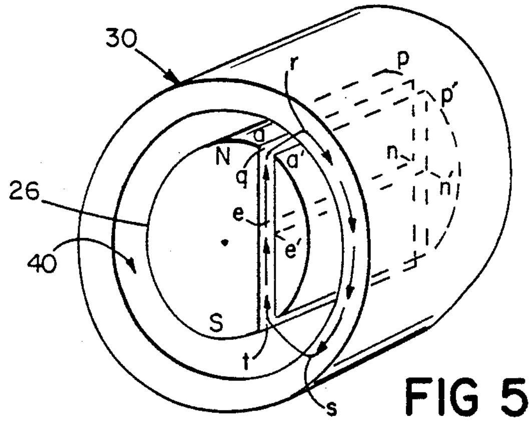
FIG. 5 is an isometric view of the rotor and stator of the tunable portion of the resonant device.

Referring to FIG. 1, a tunable resonant scanner 10 includes a rotatable mechanical suspension 12 (e.g., a flexural suspension of the kind available under the name Flexure Bearings from Bendix Corp.) which holds an optical element (not shown) for scanning a beam 14. The axis of rotation of suspension 12 is colinear with a shaft 16 that is driven by a conventional rotating actuator 18 (e.g., such as is disclosed in U.S. Pat. No. 4,090,112 and U.S. Pat. No. 4,076,998, incorporated herein by reference). Actuator 18 includes angular position or velocity sensors (not shown) that enable operation of suspension 12 and actuator 18 as either a directly driven, or a feedback controlled resonant system 20. System 20, like all resonant systems, has a characteristic resonant frequency of operation based on the inertia (I) of its moving elements and the spring constant (K) of the suspension 12.

In order to maintain or track a selected operating resonant frequency, scanner 10 is provided with a resonance tuner 22. The tuner establishes a selectable degree of shift in the spring rate of the system, thus enabling continuous, dynamic tuning of the resonant frequency. Tuner 22 is tied to suspension 12 by a rotating shaft 24, colinear with shaft 16.

Referring to FIG. 2, within tuner 22, shaft 24 is attached to a co-axially located cylindrical permanent magnet 26 having its magnetization oriented along a diameter perpendicular to the axis of rotation 28. Magnet 26 is made from a strongly anisotropic material with high coercive force, e.g., a rare earth.

A hollow, low carbon steel cylindrical shell 30 concentrically surrounds magnet 26 and is held in a fixed rotational position relative to suspension 12. (In FIG. 2, shell 30 is shown pulled away from the magnet.) One of its functions is to enhance the magnetic field in the coil region.

Two coils 32, 34 respectively lie entirely within the North (N) and South (S) magnetic fields of magnet 26.

Referring to FIG. 3, when magnet 26 is in its central rotational position (corresponding to the central rotational position of suspension 12), the two segments of coil 32 evenly straddle the N pole, and the two segments of coil 34 evenly straddle the S pole, with angles a all being approximately 45° . Coils 32, 34 are both attached to the inner wall of shell 30.

The magnetic field (B) in the air gap 40 between magnet 26 and shell 30 at the location of a segment 44 of coil 32 has a value $$B=K\,B_r\cos\theta \qquad (1)$$

that depends on the angle 0 between the axis of the magnet and the diameter on which segment 44 lies (i.e. 45° ) $B_4$ is a constant residual inductance of magnet 26, and K is a non-dimensional constant (typically between 0.5 and 1) that depends on the geometry and particular magnetic material chosen, as well as the conditions of shell 30.

Figure 7:
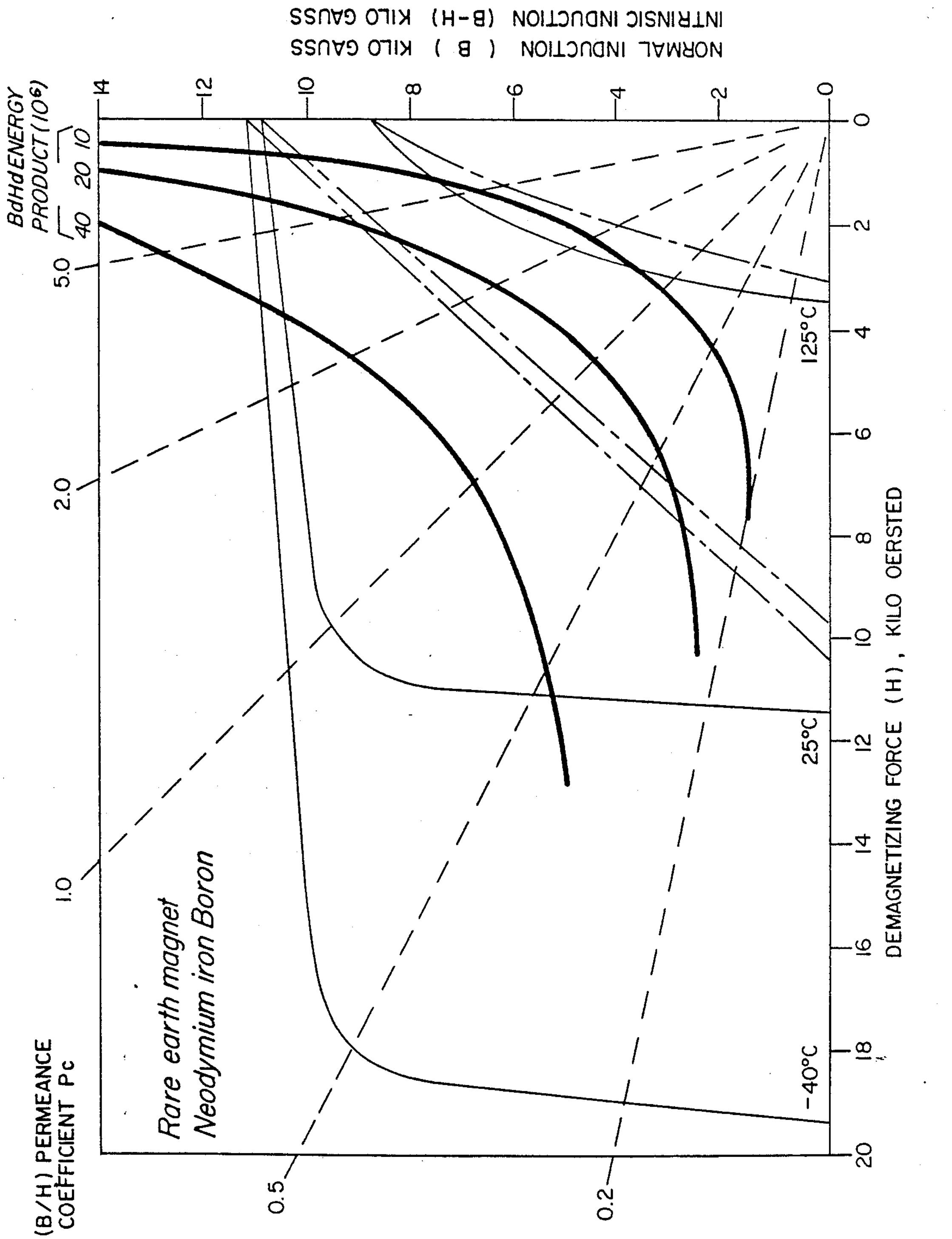
FIG. 7 shows a set of magnetization curves for neodymium iron boron.
Figure 7A:
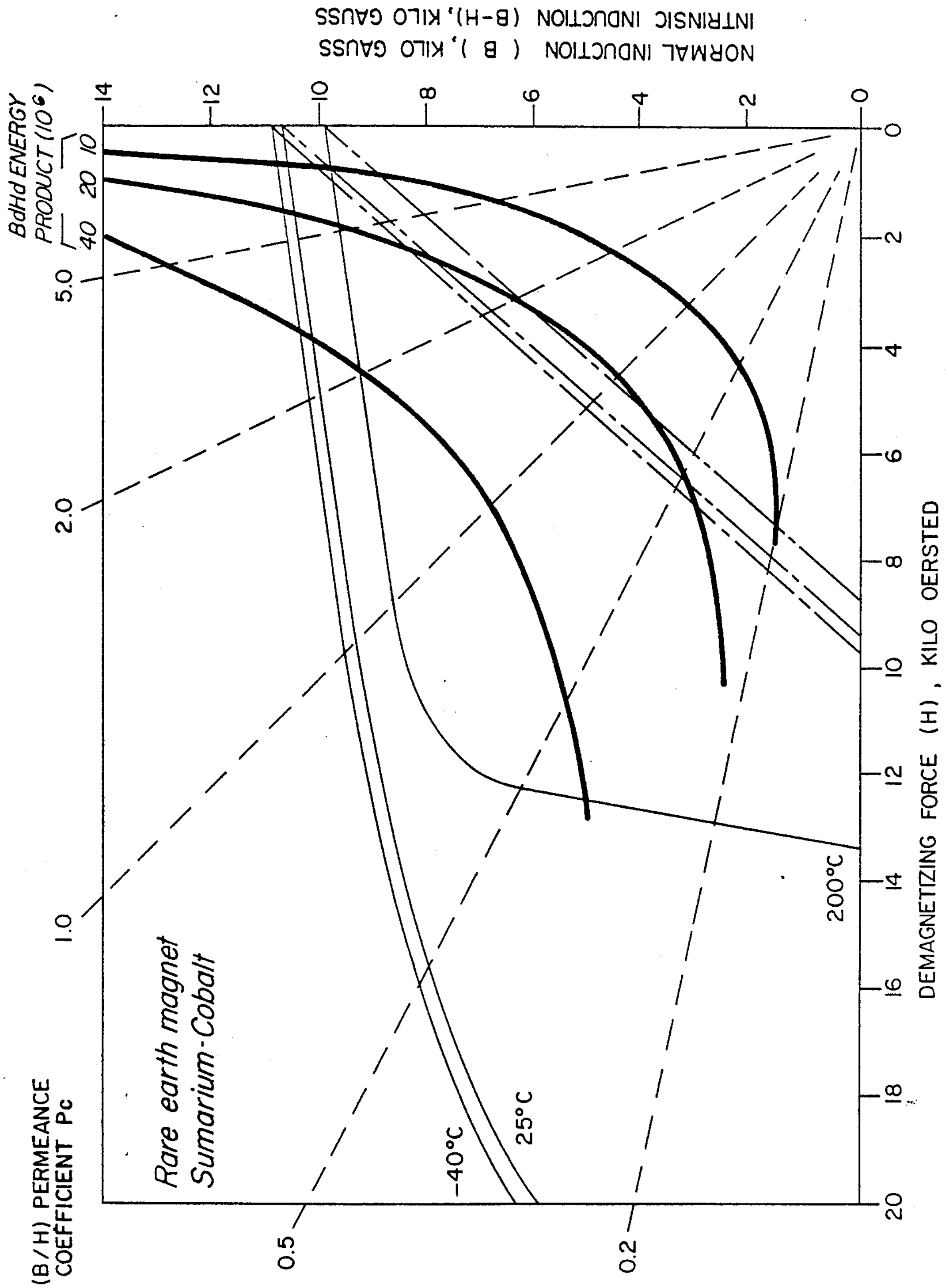
FIG. 7A shows a set of magnetization curves for samarium-cobalt.

Referring to FIGS. 5, 7, the derivation of equation (1) is as follows:

The magnetic properties of anisotropic magnet 26 at a typical operating range can be approximated by $$B_m=-H_m\,B_r/H_c+B_r \qquad (2)$$

where $B_m$ is the induction, $H_m$ is the field intensity, $B_r$ is the residual inductance, and $H_c$ is the coercive force.

Applying Ampere's Law, $\int H.dl=NI$ along path q-r-s-t of FIG. 5, assuming no currents are present, yields:

$$H_a\,2.g.F+H_m.d\cdot\cos\theta=0 \qquad (3)$$

where $H_a$ is the magnetic field intensity in the air gap 40, d is the diameter of magnet 26, and F is an experimental constant with a value of, e.g., 1.3.

Gauss's law $\oint B.dA=0$ can be applied to the elemental axial surface of the volume defined by the points a, a', p, p', n, n', e, e' where the material is sufficiently anisotropic that the field crosses only the boundaries of the surface a a' p p' and the surface e e. n n'. This yields:

$$B_m.dA_m=B_a.dA_a \qquad (4)$$

where subscript "a" refers at section nn', pp' to the air gap and subscript "m" refers to the magnet material. Because $dA_m=dA_a.\cos\theta$, equation (4) becomes $$B_m.\cos\theta = B_a. \quad (5)$$

In the air gap, $$B_a = \mu H_a, \quad (6)$$

where $\mu$ is the permeability of air.

Equations (2) and (5) combine to yield:

$$B_a/\cos\theta = B_r(1 - H_m/H_c), \quad (7)$$

and equations (3) and (6) combine to yield $$2gF\, B_a/\mu + H_m.d\cos\theta = 0 \quad (8)$$

Equations (7) and (8) simplify to $$B_a = B_r.\cos\theta/(1 + B_r/\mu H_c.2\, gF/d) \quad (9)$$

Most rare earth magnets have $B_r \simeq H_c$ and if g/d is small, typically less than 0.3, equation (9) simplifies to $$B_a = K.B_r.\cos\theta, \quad (10)$$

where $0.5 < K < 1$ the same as equation (1).

Referring to FIG. 4, if magnet 26 rotates by an angle $\gamma$ relative to coils 32 and 34, the field ($B_u$) at segment $\mu$ of coil 32 is derived from equation (1) where $\theta = 45° + \gamma$.

This simplifies to:

$$B_u = 0.707\, K\, B_r(\cos\gamma - \sin\gamma) \quad (11)$$

and similarly the field $B_v$ at segment v is:

$$B_v = 0.707\, K\, B_r(\cos\gamma = \sin\gamma) \quad (12)$$

The resulting torque (T) on coil 32 having N turns of wire, from a current I, is derived from Lorenz forces. Noting that forces at segments u and v are in opposition because the current flows in opposite directions in the two halves of coil 32, we find that $$T = 0.707\, K\, B_r\, L\, N\, I\, d\,(\sin\gamma) \quad (13)$$

where L is the length of the segment and d is twice the radius where the coil segment is located, and approximately the diameter of the magnet. For small angles, equation (13) yields approximately:

$$T = 0.707\, K\, B_r\, L\, N\, I\, d\, \gamma \quad (14)$$

As coil 32 is attached to the shell 30, T is also the torque acting upon the frame of scanner 10, which is normally held fixed. Consequently an equal torque of opposite sign is exerted on magnet 26 and hence on shaft 24.

Equation 14 is the expression of a spring where the value of the spring constant is controlled by the current (I) in coil 32. The equivalent torque constant for the two coil device (including coil 34) is:

$$T/\gamma = 1.414\, K\, B_r\, L\, N\, I\, d \quad (15)$$

For example, in a specific scanner with a 200 Hz resonant frequency, an armature with total inertia of 2.5 gm-cm$^2$, and a suspension with a spring constant of 3,790,000 dy-cm/rad, the tuner could have the following parameters:

d = 0.9 cm g = 0.4 cm

N = 175 turns/coil

L = 1 cm $B_r$ = 1.1 tesla

K = 0.5, approximately

The calculated value of the magnetic spring with a current of 0.5 ampere is $61.10^{-4}$ N-m/rad or 61,000 dy-cm/rad or 1.6% of the suspension's spring constant. This should result in a tunable resonant frequency range of approximately 0.8% of the reference frequency or 1.6 Hz. As the sign of the control spring is dependent on the current polarity, it can add or subtract to the mechanical spring. Therefore within the confines of a ±0.5 amp. control current, the total tunable frequency range is doubled, 1.6% or 3.2 Hz. This prediction comes very close to the measured value of 3.43 Hz.

Other embodiments are within the following claims. For example, because torque is strongly dependent upon the nonuniformity of the magnetic field in the area where the coils straight segments are located, a gap region with a magnetic field which is a stronger function of angular position may be created. This may be especially useful when the total angle of rotation is limited, and can be achieved in various ways, e.g., by shaping the inner wall of sleeve 30 to be noncylindrical, for example, oval shaped or an elongated circular shape. Alternatively, the magnet could have a non-circular shape or non-uniform magnetic properties. A combination of both is also possible.

Figure 6:
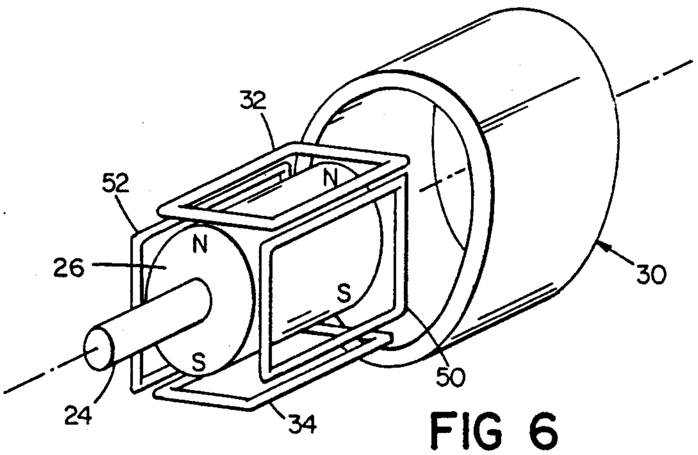
FIG. 6 shows an alternative embodiment of FIG. 2.

Referring to FIG. 6, in another embodiment driver and/or velocity sensor coils 50, 52 are within air gap 40. As electrical signals produced by the driver and/or velocity sensor coils 50, 52 alternate at the resonant frequency they can easily be distinguished from the tuning current which follows only the variations of this resonant frequency, at a much lower rate. (Suitable driver and velocity sensors are, e.g., disclosed in Montagu, U.S. Pat. No. 4,076,298, and Silverstone, U.S. Pat. No. 4,090,112.)

Referring again to FIG. 1, in another embodiment, element 18 contains both driver and tuning capabilities and element 22 contains tachometer and tuning capabilities, therefore doubling the tuning range of the system by essentially doubling the heat dissipation capability of the scanner 10.

Figure 8:
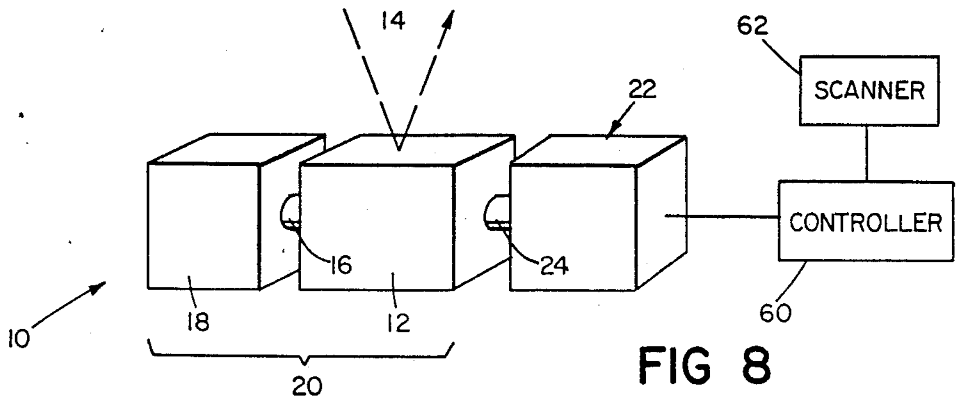
FIG. 8 is a diagrammatic view of the tunable device of FIG. 1 connected to a controller and another scanner.

Referring to FIG. 8, in another embodiment, tuner 22 is connected to a controller 60 which is in turn connected to another scanner 62. Controller 60 is arranged to dynamically control tuner 22 to cause system 20 to be tuned to the frequency of scanner 62.

What is claimed is:

1. Apparatus comprising an element mounted to rotate in oscillation about an axis, said element having a resonant frequency of rotation and being rotatable resonantly, and means for dynamically tuning said resonant frequency to a desired frequency, said means including two magnetic components which cooperate via their respective magnetic fields to form a resultant magnetic field for controlling the resonant frequency of said rotatable element, one said component being mounted for rotational motion with said element, the other said component having a fixed mounting, said components being arranged to apply said resultant field to said element to magnetically tune said resonant frequency.

2. Apparatus for dynamically tuning to a desired frequency a mechanical system of the kind having an element mounted to rotate in oscillation about an axis with resonant rotational motion through a range of excursion on either side of a central position, said apparatus comprising means for subjecting said rotatable element to a spring-like influence that is substantially proportional to the excursion from said central position in accordance with a predetermined spring constant, and means for tuning said spring constant while said element is in motion, said means including two magnetic components which cooperate via their respective magnetic fields to form a resultant magnetic field for controlling the resonant frequency of said element, one said component being mounted for rotational motion with said element, the other said component having a fixed mounting, said components being arranged to apply said resultant field to said element to magnetically tune said resonant frequency.

3. The apparatus of claim 2, wherein one said component comprises a rotor that moves with said element, said rotor being arranged to establish a magnetic field in a space adjacent to said rotor, and the other said component comprises a conductor carrying a current and positioned within said space, said conductor and said rotor being arranged such that a force imposed on said rotor by the cooperation of said magnetic field and said current varies with changes in said excursion from said central position.

4. The apparatus of claim 1 or 2 wherein said means for tuning comprises a magnet connected for motion with said resonantly rotatable element, and an electrical conductor disposed in the vicinity of said magnet such that a current in said conductor produces a force on said magnet.

5. The apparatus of claim 4 wherein said force on said magnet varies with the position of said magnet.

6. The apparatus of claim 4 wherein said force on said magnet varies generally linearly with the position of said magnet.

7. The apparatus of claim 6 wherein said force on said magnet varies nonlinearly with the position of said magnet.

8. The apparatus of claim 4 wherein said magnet comprises a cylindrical permanent magnet having its magnetic axis normal to the axis of the cylinder, and the cylinder axis of the magnet is coaxial with the rotational axis of the resonantly rotatable element.

9. The apparatus of claim 7 wherein said force on said magnet is a torque that increases with rotational angle relative to a neutral central position.

10. A tunable resonant device comprising a rotationally resonating element mounted to rotate in oscillation about an axis;

a tuner having two magnetic components which cooperate via their respective magnetic fields to form a resultant magnetic field for controlling the resonant frequency of said element;

said first component being cooperable with said second component for dynamically adjusting the resonant frequency of said element to a desired frequency, said element and first component being rotatably movable relative to a fixed reference point, and said second component being substantially fixed relative to the reference point.

11. Apparatus for dynamically tuning to a desired frequency a mechanical system of the kind having an element that is rotatable in oscillation about an axis with resonant motion through a range of excursion on either side of a central position, said apparatus comprising means for subjecting said rotatable element to a spring-like influence that is substantially proportional to the excursion from said central position in accordance with a predetermined spring constant, means for tuning said spring constant while said element is in rotary motion, said means including two components which cooperate via a magnetic field, one said component being mounted for rotary motion with said element, the other said component having a fixed mounting, wherein one said component comprises a rotor that moves with said rotatable element, said rotor being arranged to establish a magnetic field in a space adjacent to said rotor, and the other said component comprises a conductor carrying a current and positioned within said space, said conductor and said rotor being arranged such that a force imposed on said rotor by the cooperation of said magnetic field and said current varies with changes in said excursion from said central position.

12. Apparatus comprising an element mounted to rotate in oscillation about an axis, said element having a resonant frequency of rotation and being rotatable resonantly, means for dynamically tuning said resonant frequency to a desired frequency, said means including two components which cooperate via a magnetic field, one said component being mounted for rotational motion with said element, the other said component having a fixed mounting, and wherein said two components comprise a magnet connected for motion with said resonantly rotatable element, and an electrical conductor disposed in the vicinity of said magnet such that a current in said conductor produces a force on said magnet.

13. The apparatus of claim 12 wherein said force on said magnet varies with the position of said magnet.

14. The apparatus of claim 12 wherein said magnet comprises a cylindrical permanent magnet having its magnetic axis normal to the axis of the cylinder, and the cylinder axis of the magnet is coaxial with the rotational axis of the resonantly rotatable element.

15. The apparatus of claim 12 wherein said force on said magnet is a torque that increases with rotational angle relative to a neutral central position.

16. Apparatus for dynamically tuning to a desired frequency a mechanical system of the kind having an element that is rotatable in oscillation about an axis with resonant motion through a range of excursion on either side of a central position, said apparatus comprising means for subjecting said rotatable element to a spring-like influence that is substantially proportional to the excursion from said central position in accordance with a predetermined spring constant, means for tuning said spring constant while said element is in rotary motion, said means including two components which cooperate via a magnetic field, one said component being mounted for rotary motion with said element, the other said component having a fixed mounting, wherein said means for tuning comprises a magnet connected for motion with said resonantly rotatable element, and an electrical conductor disposed in the vicinity of said magnet such that a current in said conductor produces a force on said magnet.

17. The apparatus of claim 16 wherein said force on said magnet varies with the position of said magnet.

18. The apparatus of claim 16 wherein said magnet comprises a cylindrical permanent magnet having a cylinder axis and having its magnetic axis normal to the cylinder axis, and the cylinder axis of the magnet is coaxial with the rotational axis of said resonantly rotatable element.

19. The apparatus of claim 16 wherein said force on said magnet is a torque that increases with rotational angle relative to a neutral central position.

* * * * *

UNITED STATES PATENT AND TRADEMARK OFFICE
CERTIFICATE OF CORRECTION

PATENT NO. : 4,959,568

DATED : September 25, 1990

INVENTOR(S) : Brian P. Stokes

It is certified that error appears in the above-identified patent and that said Letters Patent is hereby corrected as shown below:

Column 2, line 51, "∫H.dl=NI" should be --§H.dl=NI--.

Column 4, line 24, "coils" should be --coil's--.

Under "Other Publications insert: Tweed, D.GI, "Linearizing Resonant Scanners", Lasers and Applications, pp. 65 - 69.

Signed and Sealed this

Twenty-first Day of April, 1992

*Attest:*

HARRY F. MANBECK, JR.

*Attesting Officer* *Commissioner of Patents and Trademarks*